(12) United States Patent
Plee

(10) Patent No.: US 7,608,134 B1
(45) Date of Patent: Oct. 27, 2009

(54) DECARBONATING GAS STREAMS USING ZEOLITE ADSORBENTS

(75) Inventor: Dominique Plee, Lons (FR)

(73) Assignee: CECA S.A., Puteaux (FR)

( * ) Notice: Subject to any disclaimer, the term of this patent is extended or adjusted under 35 U.S.C. 154(b) by 0 days.

(21) Appl. No.: 09/623,801

(22) PCT Filed: Mar. 4, 1999

(86) PCT No.: PCT/FR99/00497

§ 371 (c)(1),
(2), (4) Date: Nov. 17, 2000

(87) PCT Pub. No.: WO99/46031

PCT Pub. Date: Sep. 16, 1999

(30) Foreign Application Priority Data

Mar. 9, 1998 (FR) .................................. 98 02819

(51) Int. Cl.
*B01D 53/047* (2006.01)
*B01J 20/18* (2006.01)
*C01B 39/22* (2006.01)

(52) U.S. Cl. ................. 95/96; 95/106; 95/117; 95/139

(58) Field of Classification Search .......... 95/96, 95/99, 104, 105, 106, 117, 139, 148; 96/132; 423/230, DIG. 21; 502/79
See application file for complete search history.

(56) References Cited

U.S. PATENT DOCUMENTS

| 2,882,244 | A | | 4/1959 | Milton | |
|---|---|---|---|---|---|
| 5,906,675 | A | * | 5/1999 | Jain et al. | ............ 95/99 |
| 5,914,455 | A | * | 6/1999 | Jain et al. | ............ 95/96 |
| 6,270,557 | B1 | * | 8/2001 | Millet et al. | ............ 95/96 |
| 6,309,445 | B1 | * | 10/2001 | Gittleman et al. | ............ 95/96 |

FOREIGN PATENT DOCUMENTS

| EP | 0 173 501 A2 | 3/1986 |
|---|---|---|
| EP | 0 294 588 A2 | 12/1988 |
| EP | 0 718 024 A2 | 6/1996 |

OTHER PUBLICATIONS

International Search Report for PCT/FR99/00497 dated Jun. 15, 1999.

* cited by examiner

*Primary Examiner*—Frank M Lawrence
(74) *Attorney, Agent, or Firm*—Suzannah K. Sundby, Esq.; Smith, Gambrell & Russell, LLP

(57) ABSTRACT

The invention concerns a method for decarbonating gas streams polluted by $CO_2$, which consists in contacting them with an adsorbent consisting of an agglomerate of zeolite X with an Si/Al ratio of 1 to 1.15, highly sodium-exchanged comprising not more than 20% of inert binder, to eliminate at least the carbon dioxide.

12 Claims, No Drawings

US 7,608,134 B1

DECARBONATING GAS STREAMS USING ZEOLITE ADSORBENTS

TECHNICAL FIELD

The invention relates to the purification of gas flows contaminated with carbon dioxide, in particular, to the purification of air before the steps of $N_2/O_2$ separation.

BACKGROUND ART

The production of pure gases, in particular $N_2$ and $O_2$ from atmospheric air, is an industrial operation performed on a large scale and can make use either of cryogenic processes or of adsorption processes based on the principle of pressure swing adsorption (PSA), that of temperature swing adsorption (TSA) or a combination of the two (PTSA). Furthermore, many gases derived from industrial processes contain large amounts of carbon dioxide which it is often worthwhile purifying.

The production of $N_2$ or $O_2$ from air requires a purification prior to the actual separation step since, when carrying out the cryogenic processes, the water or the carbon dioxide present in the supply air can cause blockages in the equipment due to the fact that these operations are carried out at temperatures very much lower than the freezing points of these impurities. In the adsorption processes, the water and the carbon dioxide are adsorbed more strongly than the nitrogen and lead in the long run to poisoning of the adsorbent, with a consequent reduction in its life expectancy.

In these processes, a zeolite of faujasite type (13X, in which the Si/Al ratio is greater than 1.2) is very generally used to eliminate the carbon dioxide, trapping of the water generally being carried out on a bed of alumina placed upstream of the bed of molecular sieves. The regeneration is of PTSA type, i.e. a slight temperature increase to about 115° C. is combined with a decrease in pressure. By these means, the gas arriving at the bed consists only of $N_2$ and $O_2$ with about 1% by volume of argon whose adsorption behaviour can be likened to that of oxygen.

It has been known for a long time that zeolite X is a better adsorbent for carbon dioxide than silica gel or active charcoal (U.S. Pat. No. 2,882,244). That patent also teaches that the selectivity with respect to various adsorbents varies with temperature and pressure.

U.S. Pat. No. 3,885,927 (May 27, 1975) teaches that the adsorption of $CO_2$ can be carried out on a zeolite X exchanged to more than 90% with barium: under these conditions, the $CO_2$ content of the gas does not exceed 1000 ppm and the temperature can be between −40° C. and 50° C.

European patent application No. 88 10 7209.4 (May 5, 1988) teaches that a zeolite X exchanged with strontium can also be used to carry out this purification.

The influence on the adsorption of $CO_2$ of the number of exchangeable cations on the zeolite was studied by Barrer et al. in "Molecular Sieves" (Soc. Chim. Ind., London, 1968), p. 233 and by Coughlan et al. in "J.C.S. Faraday", 1, 1975, 71, 1809. These studies show that the capacity of the zeolite to adsorb $CO_2$ increases as the Si/Al ratio decreases, to a limit of 1.2, the lower range of which was not explored.

Zeolite X which has an Si/Al ratio close to 1.25 and which is commonly used, is very selective for $CO_2$, and is all the more selective the lower the temperature. At temperatures close to ambient temperatures, the efficacy decreases greatly on account of the competition with nitrogen which is present in much higher molar proportions. The $N_2/CO_2$ ratio in ambient air (with $CO_2$~300/400 vpm) is about 3000. It is thus generally essential to equip the decarbonatation stage with a refrigeration system so as to avoid the temperature increase on adsorption, this increase possibly being large (several tens of degrees) on account of the strong heats of adsorption involved.

U.S. Pat. No. 5,531,808 (Jul. 2, 1996) discloses the teaching that $CO_2$ can be adsorbed very effectively using a zeolite of type X with an Si/Al ratio of less than 1.15. The advantage over "standard" zeolite X lies in the fact that it is no longer necessary to reduce the temperature in the decarbonatation step using a cold unit since the efficacy of the zeolite is such that the selectivity for $CO_2$ over nitrogen remains high even up to 50° C.

It is observed that the capacity of a zeolite NaLSX to adsorb $CO_2$ increases as the level of exchange with sodium increases. However, it is also observed that the gain in efficacy begins to reach a plateau when exchange rates of about 90% are reached, such that there is apparently no further advantage in forcing the exchange beyond 95%. It has just been observed that this is only true for the process performed under relatively high partial pressures of $CO_2$: a very substantial gain in efficacy can be obtained for the decarbonatation under low partial pressures of $CO_2$, of about 2 mbar, with zeolites LSX in which the degree of exchange with sodium (defined as the molar ratio between the sodium ions and the aluminium atoms in a tetrahedral position, the remainder being potassium) is at least 98%.

DISCLOSURE OF INVENTION

The invention thus relates to a process for the decarbonatation of gas flows, and in particular of air, which consists in placing the said gas flow in contact with a zeolite adsorbent of NaLSX type, the adsorbent consisting of a zeolite X with an Si/Al ratio of from 1 to 1.15, in which the degree of sodium exchange is at least 98%, the remainder of the exchange capacity being occupied by potassium ions, agglomerated with a binder and in which the content of residual inert binder in the adsorbent is less than 20% by weight and preferably not more than 5% by weight.

In industrial plants, the use of zeolite adsorbents in the form of agglomerates proves to be markedly more advantageous than the use of powders since, during the manipulation of powders, for example during phases of loading and deloading of the adsorbent beds, occasionally considerable losses of pulverulent material are difficult to avoid, due in particular to the volatility of the powders, which is not particularly cost-effective for an industrial producer.

On the other hand, powder agglomerates, such as granules, beads, platelets, etc. do not have such drawbacks.

Zeolite agglomerates with a binder content of greater than 5% by weight can be obtained conventionally by mixing a crystalline zeolite powder with water and a binder (usually in powder form), followed by spraying this mixture onto zeolite agglomerates which act as agglomeration seeds. During the spraying, the zeolite agglomerates can be subjected to a continuous rotation about themselves according to a technique of "snowball" type, for example in a reactor fitted with a gyre. The agglomerates thus obtained are then in the form of beads.

Once they have been formed, the agglomerates undergo curing at temperatures generally of between 500 and 700° C., and preferably in the region of 600° C. As examples of binders, mention may be made of kaolin, silica and alumina.

The preferred agglomerates contain less than 5% by weight of binder. One process for obtaining these agglomerates with a low binder content consists in converting the binder for the agglomerates described above into a zeolite phase. For this, a zeolite LSX powder is agglomerated with a zeolitizable binder (for example kaolin or metakaolin) to begin with, followed by zeolitization by alkaline maceration, for example according to the process described in French patent application No. 97/09283, after which the zeolitized granules are exchanged with sodium. It is thus easy to obtain, according to the invention, granules with a titre of at least 95% of 98%-exchanged zeolite, which are remarkably efficient.

MODES FOR CARRYING OUT THE INVENTION

The decarbonatation process according to the invention can be carried out by passing the gas flow over one or more adsorbent beds combined in parallel or capable of linking adsorption step and desorption step (intended to regenerate the adsorbent) in a cyclic sequence; at the industrial stage, the process is preferably performed by adsorption by varying the pressure (PSA) and advantageously by adsorption by varying the pressure and temperature (PTSA). Processes of PSA and PTSA type involve the use of pressure cycles. In a first phase, the adsorbent bed ensures separation of the contaminant by adsorption of this constituent; in a second phase, the adsorbent is regenerated by lowering the pressure. At each new cycle, it is essential for the desorption of the contaminant to be as complete and as effective as possible, so as to return the adsorbent to an identical or more or less identical regenerated state at each new cycle.

The partial pressure of $CO_2$ present in the gas flow does not generally exceed 25 mbar and is preferably less than 10 mbar.

So as to continuously purify the gas flow, such as air, a certain number of adsorbent beds are arranged generally in parallel, which are subjected alternately to a cycle of adsorption with compression and desorption with decompression. In the PSA and PTSA processes, the treatment cycle to which each bed is subjected comprises the following steps:

a) passing the contaminated gas flow into an adsorption zone comprising the adsorbent bed, the adsorbent bed ensuring separation of the contaminant(s) (in this case $CO_2$) by adsorption, b) desorbing the adsorbed $CO_2$ by establishing a pressure gradient and gradually lowering the pressure in the said adsorption zone in order to recover the $CO_2$ at the adsorption zone inlet;

c) raising the pressure of the said adsorption zone by introducing a stream of pure gas via the adsorption zone outlet.

Thus, each bed is subjected to a treatment cycle comprising a phase of producing pure gas, a second phase of decompression and a third phase of recompression.

If the only contaminant to be removed from the gas flow is $CO_2$, only one adsorbent bed, consisting essentially of agglomerates of zeolite NaLSX as defined above, is placed in the adsorption zone.

If there are several contaminants to be removed, the adsorption zone can then comprise several beds of adsorbent capable of adsorbing the unwanted impurities or contaminants. Thus, in order to remove the carbon dioxide and water contained in air, a drying agent will be combined, in order to adsorb the water, such as alumina or a silica gel, with the adsorbent of the present invention.

So as to optimize the PSA and PTSA processes, the decompression and compression phases in the various adsorbent beds are synchronized: it proves to be particularly advantageous to introduce steps of pressure equalization between two adsorbent beds, one being in decompression phase and the other in recompression phase.

During the implementation of the process according to the invention, the adsorption pressures are generally between 0.2 and 20 bar and preferably between 1 and 10 bar, while the desorption pressures are generally between 0.02 and 5 bar and preferably between 0.1 and 2 bar.

As for the decarbonatation processes of the state of the art, the temperatures in the adsorption zone are generally between 20 and 80° C. and advantageously between 30 and 60° C.; in the decarbonatation processes of the state of the art, the regeneration temperatures required in order to obtain a sufficient regeneration of the adsorbent are typically from about 130 to 170° C., which makes it necessary to heat the adsorbent and increases the cost of the industrial plant.

Compared with the state of the art, the present invention offers a substantial additional advantage as regards the regeneration of the adsorbent, since, in order to obtain the same efficiency for the adsorbent after it has been regenerated, the regeneration temperatures to be used are between 100 and 120° C. and are thus much lower than those which have been used hitherto.

EXAMPLES

In the examples presented, the zeolite is a zeolite LSX, with an Si/Al ratio=1, obtained according to the following experimental mode.

a) Preparation of the Zeolite LSX.

A zeolite of faujasite LSX type, with an Si/Al ratio=1 is synthesized by mixing the following solutions:

Solution A:

136 grams of sodium hydroxide and 73 grams of potassium hydroxide (expressed as pure material) are dissolved in 280 grams of water. The solution is brought to the boiling point between 100-115° C. and 78 grams of alumina are then dissolved. Once the dissolution is complete, the solution is cooled and is made up to 570 grams with water in order to take account of the water evaporated.

Solution B:

300 grams of water and 235.3 grams of sodium silicate (25.5% $SiO_2$; 7.75% $Na_2O$) are mixed with gentle stirring. The silicate solution is added to the aluminate solution over about 2 minutes with vigorous stirring using a Rayneri type deflocculating turbomixer rotating at 2500 rpm (peripheral speed=3.7 m/s) and the gel formed is then left at 60° C. for 24 hours without stirring. After this period, considerable decantation is observed, which is characteristic of the crystallization process. A filtration is then carried out, followed by washing with about 15 ml of water per gram of solid. This solid is then dried in an oven at 80° C. The composition of the synthetic gel is:

Chemical analysis of the solid resulting from the synthesis gives a composition:

X-ray diffraction analysis confirms that the powder formed consists of practically pure faujasite, accompanied by traces of zeolite A, the content of which is estimated at less than 2%. A measurement of the toluene-adsorption capacity is carried out, after calcination at 550° C. for 2 hours, under an inert atmosphere: an adsorbed capacity of 22.5% at 25° C. and at a partial pressure of 0.5 is found.

The sodium exchange was carried out in several successive exchanges, with a liquid/solid (L/S) ratio of 10 ml/g, with a sodium chloride solution at a concentration of 1 mol of NaCl per liter, at 90° C. for 3 hours, each exchange being followed by one or more intermediate washes. The $CO_2$-adsorption capacities are measured after degassing under vacuum at 300° C. for 16 hours.

Example 1

The adsorbent used is a granule obtained as follows from the LSX powder described above.

42.5 grams (expressed as calcined equivalent), 7.5 grams of a fibrous clay (expressed as calcined equivalent), 1 gram of carboxymethylcellulose and enough water to be able to carry out an extrusion in the form of extrudates 1.6 mm in diameter and about 4 mm in length are mixed together. The extrudates are dried at 80° C. and are then calcined at 550° C. for 2 hours under an inert atmosphere.

Table 1 presents the results obtained in terms of $CO_2$-adsorption capacity (in $cm^3/g$) at 25° C. and at various pressures of $CO_2$, for granules of zeolite NaLSX agglomerated with 15% binder and whose degree of sodium exchange is variable. They unequivocally show the value of an NaLSX adsorbent with a high degree of sodium exchange for decarbonatation at low partial pressures.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The foregoing references are hereby incorporated by reference.

TABLE 1

| Degree of sodium exchange | Pressure | | |
|---|---|---|---|
| | 2 mbar | 5 mbar | 10 mbar |
| 94.5% | 25 | 37.2 | 45.5 |
| 97.5% | 29.2 | 40.3 | 47.8 |
| 99.5% | 32.5 | 42 | 49 |

It is clearly seen that the gains in terms of capacity are greater for low pressures than for high pressures.

Example 2

The adsorbent used is a granule (zeolitized) obtained from zeolite LSX powder as described above.

The zeolite LSX powder of Example 1 is used by agglomerating, with a mixture of a montmorillonite-type clay (15%), a kaolin-type clay (85%), a small amount of carboxymethylcellulose and water. Once the extrusion is complete, drying at 80° C. and calcination at 500° C. are carried out for 2 hours, under an inert atmosphere free of water vapour.

10 grams of these agglomerates are immersed in 17 ml of a sodium hydroxide solution at a concentration of 220 g/l for 3 hours at 95° C. The agglomerates are then successively washed four times by immersion into water in a proportion of 20 ml/g.

The toluene-adsorption capacity measurements are carried out under the conditions described above, and the following values are found:

Agglomerated LSX (untreated) 20.2%
Agglomerated LSX (treated with NaOH) 22.4%

This toluene-adsorption value reflects the fact that the adsorbent substance consists of more than 95% zeolite. These results reflect the good efficacy of the zeolite substances according to the invention and also reflect a higher crystallinity of the LSX obtained by zeolitization with sodium hydroxide. The high-resolution silicon NMR spectrum shows that the Si/Al ratio is equal to 1.01 in the crystal lattice.

Table 2 shows the results obtained in terms of $CO_2$-adsorption capacity (in $cm^3/g$) under various partial pressures of $CO_2$ for granules of zeolite NaLSX containing 5% of zeolitized binder and whose degree of sodium exchange is variable.

TABLE 2

| Degree of sodium exchange | Pressure | | |
|---|---|---|---|
| | 2 mbar | 5 mbar | 10 mbar |
| 94% | 30 | 43.4 | 53.5 |
| 97.5% | 35 | 47 | 56 |
| 99% | 38.5 | 49 | 58 |

The invention claimed is:

1. Process for the decarbonation of gas flows, contaminated with $CO_2$, comprising placing in contact the gas flow to be purified, in an adsorption zone, with at least one adsorbent consisting essentially of a zeolite containing NaLSX type with an Si/Al ratio of 1 to 1.15, exchanged with sodium to a degree of greater than or equal to 98%, the degree of exchange being expressed as the ratio between the number of sodium ions and the number of aluminum atoms in a tetrahedral position, the remainder of the exchange capacity being occupied by potassium ions, agglomerated with a binder, the content of residual inert binder in the adsorbent being less than or equal to 20% by weight.

2. Process according to claim 1, wherein the content of residual inert binder in the agglomerated zeolite composition is not more than 5% by weight.

3. Process according to claim 1, wherein it is performed by pressure swing adsorption (PSA).

4. Process according to claim 1, wherein the zeolite X has an Si/Al ratio of 1.

5. Process according to claim 1, wherein adsorption pressures are between 1 and 10 bar and desorption pressures are between 0.1 and 2 bar.

6. Process according to claim 1, wherein it comprises carrying out a treatment cycle comprising:
 a) passing the contaminated gas flow into an adsorption zone comprising an adsorbent bed, the adsorbent bed ensuring separation of the contaminant(s) by adsorption,
 b) desorbing the adsorbed $CO_2$ by establishing a pressure gradient and gradually lowering the pressure in the adsorption zone to recover the $CO_2$ at the adsorption zone inlet;
 c) raising the pressure of the adsorption zone by introducing a stream of pure gas via the adsorption zone outlet.

7. Process according to claim 6, in which the adsorbent is regenerated at a temperature between 100 and 120° C.

8. Process for purifying air contaminated with $CO_2$ and $H_2O$, comprising gas flow to be purified is placed in contact, in an adsorption zone, with at least one drying agent and at least with an adsorbent consisting generally of zeolite containing NaLSX type with an Si/Al ratio of 1 to 1.15, exchanged with sodium to a degree of greater than or equal to 98%, the degree of exchange being expressed as the ratio between the number of sodium ions and the number of aluminum atoms in a tetrahedral position, the remainder of the exchange capacity being occupied by potassium ions, agglomerated with a binder, the content of residual inert binder in the adsorbent being less than or equal to 20% by weight.

9. Process according to claim 8, wherein it comprises carrying out a treatment cycle comprising:

a) passing contaminated gas flow into an adsorption zone comprising a drying-agent bed and an adsorbent bed, with at least one adsorbent consisting essentially of a zeolite containing NaLSX type with an Si/Al ratio of 1 to 1.15, exchanged with sodium to a degree of greater than or equal to 98%, the degree of exchange being expressed as the ratio between the number of sodium ions and the number of aluminum atoms in a tetrahedral position, the remainder of the exchange capacity being occupied by potassium ions, agglomerated with a binder, the content of residual inert binder in the adsorbent being less than or equal to 20% by weight, b) desorbing the adsorbed $CO_2$ by establishing a pressure gradient and gradually lowering the pressure in the adsorption zone to recover the $CO_2$ at the adsorption zone inlet;

c) raising the pressure of the absorption zone by introducing a stream of pure gas via the adsorption zone outlet.

10. Process according to claim 1, wherein the gas is air.

11. Process according to claim 3, wherein the process is performed by pressure temperature swing adsorption (PTSA).

12. Process according to claim 8, wherein the drying-agent contains alumina.

\* \* \* \* \*